United States Patent [19]

Himmler et al.

[11] Patent Number: 5,067,348
[45] Date of Patent: Nov. 26, 1991

[54] ROTARY MEMBER MEASURING APPARATUS WITH IMPROVED SUPPORT BED

[75] Inventors: Günther Himmler, Darmstadt; Uwe Moench, Bensheim, both of Fed. Rep. of Germany

[73] Assignee: Gebr. Hofmann GmbH & Co. KG Maschinenfabrik, Pfungstadt, Fed. Rep. of Germany

[21] Appl. No.: 511,084

[22] Filed: Apr. 19, 1990

[30] Foreign Application Priority Data

Jun. 14, 1989 [DE] Fed. Rep. of Germany ....... 3919450

[51] Int. Cl.$^5$ .............................................. G01M 1/02
[52] U.S. Cl. ........................................ 73/460; 73/146; 248/679
[58] Field of Search ............... 73/460, 471, 487, 146; 248/679

[56] References Cited

U.S. PATENT DOCUMENTS

| | | | |
|---|---|---|---|
| 3,252,332 | 5/1966 | Senger | 73/471 |
| 3,948,095 | 4/1976 | Burgett et al. | 73/146 |
| 4,404,851 | 9/1983 | Curchod | 73/460 |
| 4,653,324 | 3/1987 | Nugier | 73/460 |
| 4,826,127 | 5/1989 | Koblischek et al. | 248/679 |

OTHER PUBLICATIONS

H. Schultz and R. G. Nicklau; "Konstruktives Gestalten von Werkzeugmaschinengestellen aus Polymerbeton;" Werkstatt und Betrieb 115 (1982); pp. 311–316.

Primary Examiner—John E. Chapman
Attorney, Agent, or Firm—Cushman, Darby & Cushman

[57] ABSTRACT

A measuring apparatus in which a rotary member is mounted and rotated for measurement or testing thereof, with measuring devices including measurement value pick-up structures for periodically detecting varying forces and/or moments caused by the rotating rotary member. The measuring apparatus includes a machine bed which serves as a component for carrying the measuring devices and for mounting the rotary member. The machine bed is in the form of a casting comprising polymer concrete.

6 Claims, 2 Drawing Sheets

ROTARY MEMBER MEASURING APPARATUS WITH IMPROVED SUPPORT BED

BACKGROUND OF THE INVENTION

The invention concerns a measuring apparatus for measuring periodically varying forces and/or moments which occur on a rotating rotary member, for example unbalance effects or non-uniformities in respect of the rotary member which can be for example in the form of a pneumatic tire.

In measuring apparatuses for measuring unbalance phenomena on rotary bodies to be balanced or in testing machines for testing the uniformity of rotary members, for example pneumatic tires for motor vehicle wheels, the structure generally includes a machine bed which serves as a common supporting component for a measuring means for detecting the forces and/or moments involved, and the means for rotatably mounting the rotary member. The machine bed conventionally comprises a hollow box-like welded construction consisting of steel to which the mounting and fixing means for the components of the measuring means and rotary member mounting means are also welded.

In such measuring apparatuses, the measuring means for detecting the forces and/or moments include measurement value pick-up means or detectors which detect oscillations or vibrations due to the forces and/or moments in question. Besides the vibration which is due to unbalance or irregularity of the rotating rotary member, the vibrations detected by the measurement value pick-up means also include a number of other vibration components which have a disturbance effect and thus can falsify the measurement result. Those disturbing vibration components are transmitted to the measurement value pick-up assembly in particular from the outside of the apparatus structure, by way of the machine bed thereof. In addition, during a measuring run in which the rotary member to be tested and other components which rotate therewith are driven in rotation at a suitable speed, the rotary member and the components rotating therewith produce natural oscillations or vibrations of the machine bed, which are transmitted from there into the measurement value pick-up assembly.

As indicated above, in the above-discussed measuring apparatuses, the machine bed performs the function of a common supporting component for the measuring means and the means for mounting the rotary member. Nonetheless, the disadvantages of such an arrangement were accepted insofar as interference oscillations or vibrations were not prevented from being transmitted into the measurement value pick-up system so that interference vibrations or oscillations originating from outside the apparatus and also caused by natural vibration or oscillation of the machine bed were transmitted into or induced in the measurement value pick-up system.

SUMMARY OF THE INVENTION

An object of the present invention is to provide a measuring apparatus for measuring periodically varying forces and/or moments on a rotating rotary member, which is adapted to provide for effective suppression of interference vibrations which act on the measurement value pick-up system of the apparatus.

Another object of the present invention is to provide an apparatus for measuring periodically varying forces and/or moments on a rotating rotary member, having a machine bed of a specific design configuration adapted effectively to suppress vibration acting on the measurement value pick-up assembly of the apparatus, which results from natural vibration of the machine bed and from interference vibration from outside the apparatus.

Still another object of the present invention is to provide an apparatus for measuring varying forces and/or moments acting in relation to a rotary member in the course of rotation thereof for testing purposes, with a machine bed which affords a high degree of stiffness to act as a suitable support and which also provides very good vibration-damping properties.

Still a further object of the present invention is to provide a measuring apparatus for measuring varying forces and/or moments on a rotating rotary member having a machine bed of a simple nature which is nonetheless capable of providing an effective vibration-damping effect.

In accordance with the present invention these and other objects are achieved by a measuring apparatus for measuring at least one of the periodically varying forces and moments which occur at a rotating rotary member such as a pneumatic tire for a motor vehicle, which are detected in the form of radial, lateral and/or tangential forces or fluctuations therein, comprising a measuring means for detecting the force and/or moment involved. The apparatus further includes a mounting means for rotatably mounting the rotary member to be measured, and a machine bed which is stationarily mounted on a suitable foundation means and which serves as a common supporting component for the measuring means and the rotary member mounting means. The machine bed is in the form of a block-shaped casting comprising hardened, highly filled reaction resin (also referred to as a casting resin concrete or as a polymer concrete).

Highly filled reaction resins of that kind have been used for decades in structural and civil engineering, in particular as bridge supports, cable ducts and also in the sanitary and waste water field and as insulators for high tension pylons. In comparison with cementbased concrete, in polymer concrete the cement binding which is formed from the cement and water and which holds the fillers or additive materials together is replaced by the reaction resin and suitable filler such as dust powder material.

'Werkstatt und Betrieb 115' (1982)5, pages 311 through 316, H Schulz and R-G Nicklau 'Konstruktives Gestalten von Werkzeugmaschinengestellen aus Polymerbeton' discloses using polymer concrete in relation to machine tool support structures, in particular for grinding machines and high-speed milling machines. In that connection the predominant considerations are in respect of a sufficient level of strength and in particular bending and torsional strength, as well as weight.

In connection with the measuring apparatuses with which we are concerned here, in particular testing machines such as tire testing machines and balancing machines, the problem which arises however is that of suppressing the interference vibration which can be transmitted to the measuring means by way of the machine bed of the machine. Surprisingly, it has now been found that the machine bed constructed in accordance with the principles of the present invention, in the form of a cast block of polymer concrete or casting resin concrete, permits such vibration or oscillation to be substantially effectively suppressed. The vibration or oscillation in question is in particular that which acts on the machine from outside same and natural vibration of the machine bed, which is produced by the rotary member and components which rotate therewith. The machine bed in the apparatus in accordance with the invention does not have any critical resonance points in the ranges of rotary speed which are used in testing and measuring rotary members, so that the machine bed does not suffer from any natural vibration. In addition the machine bed according to the invention, for supporting the measurement value pick-up means, provides a counteracting mass which practically tends towards infinity, while in addition, by virtue of its block configuration and the material properties thereof, it affords a high degree of stiffness and, as has been shown, in contrast to conventional concrete, very good vibration damping properties. The polymer concrete, upon setting thereof, also affords shrinkage characteristics which are favourable in comparison with steel.

It will be seen therefore that the machine bed according to the invention, in contrast to machine beds in conventional machines, does not have an adverse effect when carrying out testing and measuring runs involving rotating a rotary member to measure periodically varying forces and/or moments in respect thereof, which are detected in the form of radial, lateral and/or tangential forces or fluctuations therein. The choice of suitable speeds of rotation for carrying out the testing and measuring runs is not restricted by virtue of resonance characteristics of the machine bed but rather the machine bed according to the invention, in contrast to conventional machine beds, makes an active contribution to the production of a useful signal in testing anad measuring a rotating member as the bed provides for the effective suppression of interference vibration.

Further objects, features and advantages of the present invention will be apparent from the following description of preferred embodiments thereof.

DESCRIPTION OF PREFERRED EMBODIMENTS

Figure 1:
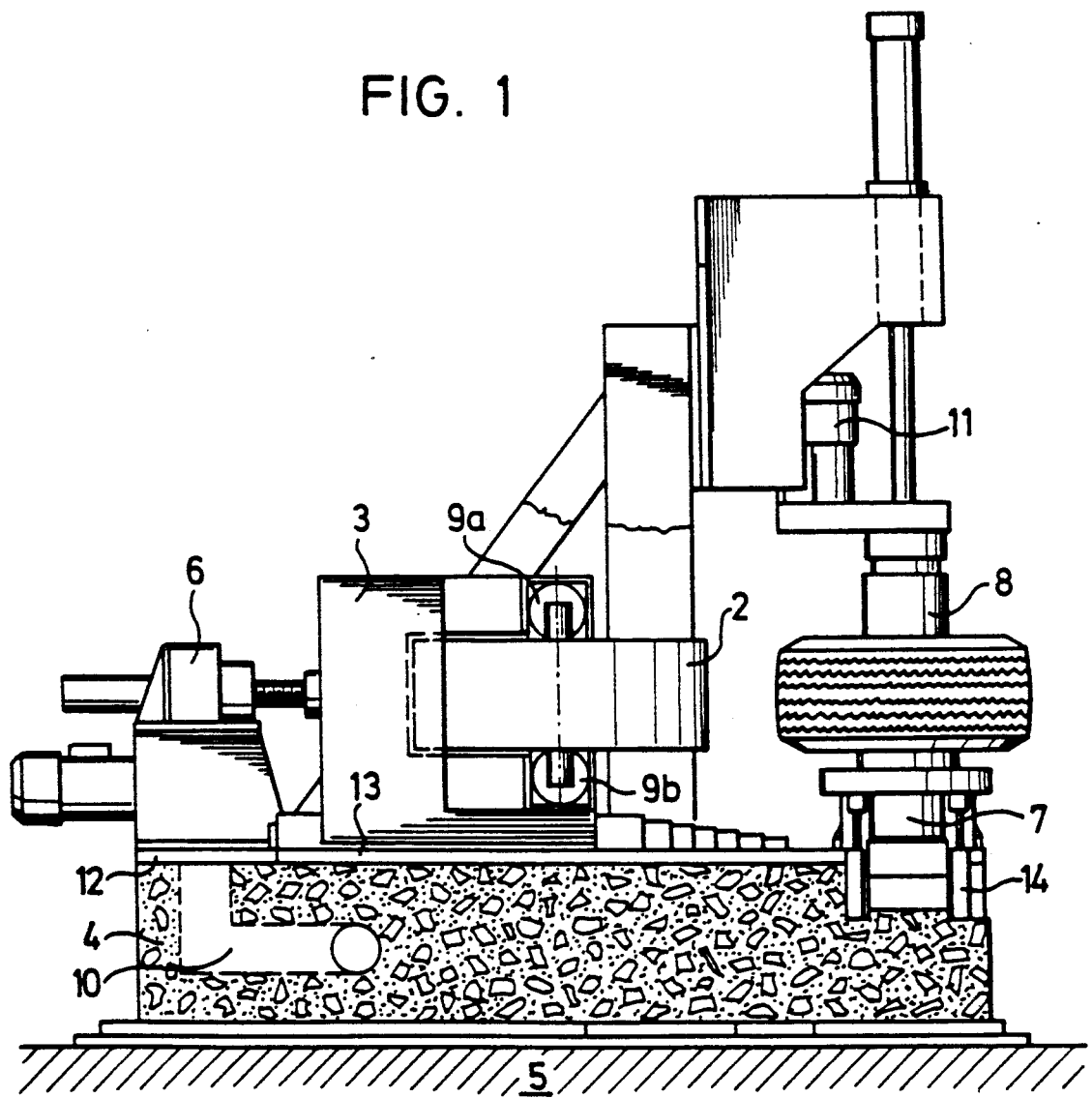
FIG. 1 is a diagrammatic view of an embodiment of the apparatus according to the invention, in the form of a tire testing machine.

Referring firstly to FIG. 1, shown therein is a measuring apparatus in accordance with the present invention, in the form of a tire testing machine, in which a tire 1 to be tested therein is supported between first and second tire mounting means 7 and 8, being a lower mounting means 7 and an upper mounting means 8. The tire mounting means 7 and 8 have measuring rim members which can be moved towards and away from each other in the axial direction of the tire 1. Reference numeral 11 denotes a drive motor for driving the tire 1 to be tested, at the desired testing speed.

The tire testing machine shown in FIG. 1 also comprises a pressure wheel 2 mounted on a movable carriage 3. The carriage 3 can be displaced in a radial direction with respect to the tire 1, that is to say in a horizontal direction in the illustrated embodiment. Measurement value pick-up devices 9a and 9b are provided at the axis of the pressure wheel 2. During a measuring run, during which the pressure wheel 2 is pressed against the tread surface of the tire 1 to be tested, the pick-up devices 9a and 9b measure radial force fluctuations and/or lateral force fluctuations and/or tangential force fluctuations which are effective in the contact surface or contact patch with which the tire 1 and the pressure wheel 2 are in contact with each other. After suitable evaluation in an evaluation circuit (not shown), the above-indicated fluctuations in force provide information about the uniformity of the tire 1 being tested.

So that the pressure wheel 2 can be pressed against the tire 1 with a given force, the FIG. 1 machine includes a pressing unit 6 with which the carriage 3 is displaced in a horizontal direction and thereby pressed against the tire 1.

As a common supporting component for the tire mounting means 7 and 8 and the carriage 3 and also the pressing unit 6, the FIG. 1 machine has a machine bed 4 which is suitably secured to a foundation structure as indicated at 5. The machine bed 4 comprises a block-shaped cast body of polymer concrete or casting resin concrete, or hardened highly filled reaction resin. Fixing means 12 for the pressing unit 6 and fixing means 14 for the lower tire mounting means 7 are positively and force-lockingly cast in the cast block forming the machine bed 4, which is in one piece. Guide rails 13 for the movement of the carriage 3 are also positively and force-lockingly cast at the top surface of the cast block of the machine bed 4. In addition, ducts of which one duct 10 is illustrated in FIG. 1, can be cast in the cast block of the machine bed 4. The ducts as indicated at 10 may be provided for carrying electrical cables for example the pressing unit 6, or hydraulic or pneumatic conduits. It is also possible however to provide ducts for electrical cables which come from the measurement value pick-up devices 9a and 9b and which go to the above-mentioned electronic evaluation circuitry.

For the purposes of making the cast block forming the machine bed 4, a filler mixture which contains the necessary amount of dust powder material, for example calcite and crystal quartz, such as granite, and to which a starter is added for the reaction resin, together with the reaction resin which is preferably a methacrylate-base resin and which has a viscosity similar to that of water, are mixed in a suitable mixer. The mixture is then introduced into a casting mold in which the mixture is compacted by suitable vibrators and hardened. That then results in the cast block required for providing the machine bed 4. In the casting operation, the fixing means for example in plate form for columns and pillars of the measuring apparatus are simultaneously cast into the cast block which is produced in one piece, together with the above-mentioned fixing means 12 and 14 and the guide rails 13.

In the illustrated embodiment in FIG. 1 the tire 1 to be tested is arranged horizontally in the measuring apparatus, but it will be appreciated that it is also possible to use the machine bed 4 consisting of the cast polymer concrete block in a measuring apparatus such as a tire testing machine in which the tire is disposed in a vertical position.

Figure 3:
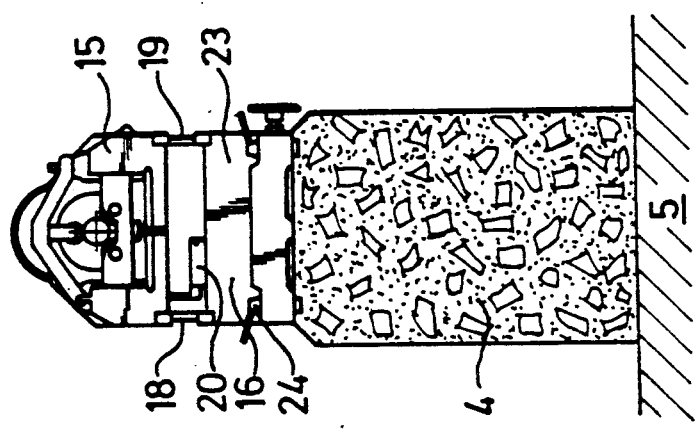
FIG. 3 is an end view of the balancing machine shown in FIG. 2.
Figure 2:
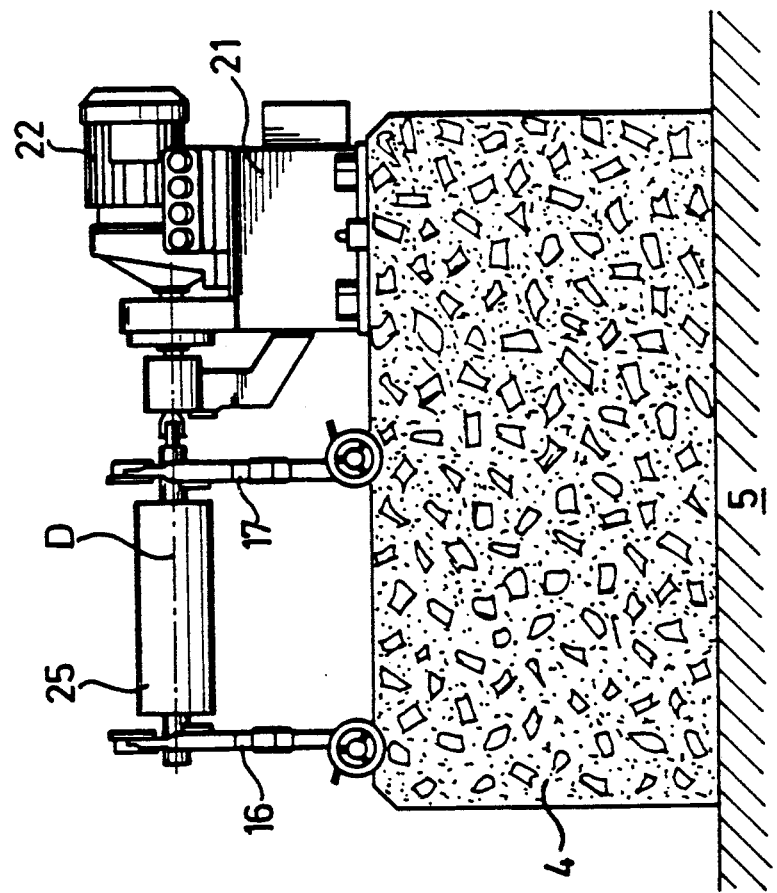
FIG. 2 shows another embodiment of the apparatus according to the invention, in the form of a balancing machine.

Referring now to FIGS. 2 and 3, shown therein is an embodiment of an apparatus according to the invention in the form of an unbalance measuring apparatus in which a rotary member in the form of a rotor indicated at 25 can be mounted in a horizontal position rotatably about an axis as indicated at D in a rotor mounting arrangement comprising two mounting stands or supports 16 and 17. FIG. 2 is a side view of the apparatus while FIG. 3 is an end view looking on to the end of the apparatus which is at the left in FIG. 2. Each of the two mounting stands or supports 16 and 17 comprises a lower mounting stand portion 23 which is secured to a machine bed 4 by fixing means 24. The mounting stands or supports 16 and 17 are mounted displaceably in guides in a horizontal direction on the machine bed 4; the guides are positively and firmly cast in the machine bed 4 at the top thereof, the machine bed 4 also comprising a cast block of polymer concrete, as described above with reference to FIG. 1.

An oscillating device 15 with rotor mounting means is supported on the lower mounting support portion 23 by way of vertical support springs 18 and 19. Periodic vibrations or oscillations or fluctuations in force which are generated during the rotary movement of the rotor as a result of unbalance thereof are detected by a measurement value pickup device 20 which can be of a force-measuring or travel-measuring kind, and then subjected to suitable evaluation in an evaluation arrangement (not shown).

The machine shown in FIGS. 2 and 3 has a drive motor 22 which is suitably connected to the rotor 25 for driving it in rotation. The drive motor 22 is mounted on a drive block 21 which is secured to the top surface of the machine bed 4.

In both embodiments shown in FIG. 1 and FIGS. 2 and 3 respectively, interference vibrations or oscillations which originate from the foundation structure 5 as well as interference vibrations or oscillations which occur at components which rotate with the rotary member and in particular at the drive side for the rotary member and which in the prior-art apparatuses are transmitted to the measurement value pick-up devices 9a and 9b in FIG. 1 or the measurement value pick-up device 20 shown in FIGS. 2 and 3 by way of the machine bed 4 are suppressed in the apparatus according to the invention by virtue of the configuration according to the invention of the machine bed 4. The machine bed 4 thus performs an active function in regard to suppressing undesirable vibration.

It may be noted at this point that the starting materials for the hardened, highly filled reaction resin or polymer concrete are so matched to each other that about 100 kg of filler mixture which also contains the reaction resin starter and about 7 to 8 liters of reaction resin of a viscosity corresponding to that of water may be used in producing the polymer concrete for making the machine bed.

It will be appreciated that the above-described apparatuses have been set forth solely by way of example and illustration of the principles of the present invention and that various modifications and alterations may be made therein without thereby departing from the spirit and scope of the invention.

We claim:

1. A rotary member measuring apparatus for measuring at least one of the periodically varying forces and moments produced by a rotating rotary member, where at least one of a radial, lateral, and tangential force fluctuation is detected, comprising:
   mounting means for rotatably mounting the rotary member;
   means for detecting at least one of a radial, lateral, and tangential force; and
   a stationary machine bed providing a foundation for the measuring apparatus and which serves as a common supporting component for the detecting means and the rotary member mounting means, the machine bed being in the form of a block-shaped casting comprised of polymer concrete.

2. Apparatus as set forth in claim 1 including ducts for lines in said block-shaped casting.

3. An apparatus as in claim 1 further including mounting members firmly cast into the block-shaped casting for mounting said mounting means and said detecting means on the machine bed.

4. Apparatus as set forth in claim 3 wherein said mounting members are of metal and include fixing members and guide members.

5. An apparatus as in claim 1 wherein the polymer concrete is comprised of a hardened, highly filled reaction resin, the filling comprising a mixture of calcite and crystal quartzes and wherein the reaction resin comprises methacrylate-base resin.

6. An apparatus as in claim 1 wherein the starting materials for the polymer concrete includes about 100 kg of filler mixture also containing a reaction resin starter and about 7 to 8 liters of reaction resin of a viscosity equal to water.

* * * * *